United States Patent
Ohno et al.

[11] Patent Number: 5,745,475
[45] Date of Patent: Apr. 28, 1998

[54] OPTICAL INFORMATION RECORDING MEDIUM

[75] Inventors: Eiji Ohno, Hirakata; Kenichi Nishiuchi, Moriguchi; Yoshitaka Sakaue, Nara; Kazuhisa Ide, Osaka; Naoyasu Miyagawa, Suita; Nobuo Akahira, Yawata, all of Japan

[73] Assignee: Matsushita Electric Industrial Co., Ltd., Osaka, Japan

[21] Appl. No.: 884,318

[22] Filed: Jun. 27, 1997

Related U.S. Application Data

[63] Continuation of Ser. No. 424,818, Apr. 19, 1995, abandoned.

[30] Foreign Application Priority Data

Apr. 20, 1994 [JP] Japan .................. 6-081532

[51] Int. Cl.$^6$ .................................................. G11B 7/24
[52] U.S. Cl. .................................................. 369/275.4
[58] Field of Search ........................ 369/275.1, 275.2, 369/275.3, 275.4, 275.5, 13, 94

[56] References Cited

U.S. PATENT DOCUMENTS

| | | | |
|---|---|---|---|
| 5,249,175 | 9/1993 | Akahira et al. | 369/275.1 |
| 5,274,623 | 12/1993 | Usami et al. | 369/275.4 |

FOREIGN PATENT DOCUMENTS

| | | |
|---|---|---|
| 63-57859 | 11/1988 | Japan . |
| 2-73537 | 3/1990 | Japan . |
| 5-128589 | 5/1993 | Japan . |
| 5-282705 | 10/1993 | Japan . |

OTHER PUBLICATIONS

N. Tokushuku, et al., "High C/N Recording in $Sb_2Se_3$/Bi Write–Once Disk", *Japanese Journal of Applied Physics*, vol. 31, pp. 456–460 (1992).

N. Yamada et al., "High Speed Overwritable Phase Change Optical Disk Material", *Japanese Journal of Applied Physics*, vol. 26, Supplement 26–4, pp. 61–66.

*Primary Examiner*—Nabil Hindi
*Attorney, Agent, or Firm*—Ratner & Prestia

[57] ABSTRACT

An optical information recording medium includes: a substrate including a groove having a concave shape and a land having a convex shape adjacent to the groove; and a recording layer on the substrate, wherein the recording layer consists of a material which changes between a first state and a second state whose optical property is different from that of the first state, a first portion of the optical information recording medium including a portion in the first state of the recording layer having a first reflectance, and a second portion of the optical information recording medium including a region in the second state of the recording layer having a second reflectance which is different from the first reflectance, whereby information is recorded onto the groove and the land, and wherein a ratio of the first reflectance to the second reflectance, a phase of reflected light from the first portion and a phase of reflected light from the second portion are set such that at least one of an amplitude and a carrier to noise ratio (CNR) of a signal obtained by reproducing information from the groove is approximately identical to that from the land.

16 Claims, 6 Drawing Sheets

OPTICAL INFORMATION RECORDING MEDIUM

This application is a continuation of application Ser. No. 08/424,818, filed Apr. 19, 1995, now abandoned.

BACKGROUND OF THE INVENTION

1. Field of the Invention

The present invention relates to an optical information recording medium, in particular, to an optical disk, for recording/reproducing information with high speed and high density by using light.

2. Description of the Related Art

When a laser beam is converged by a lens system, a small light spot with a diameter in the order of the wavelength of the light, can be formed. Therefore, it is possible to form a light spot having high energy density per unit area even from a light source with a low output power. It is possible to change the state of the fine region of a substance by using a light beam with high energy density. It is also possible to read the state of change of the fine region. An optical information recording medium applies such a principle to the recording/reproduction of information. Hereinafter, the optical information recording medium is referred to as an "optical recording medium" or simply as a "recording medium". A method for recording and reproducing information is classified into two types by effects of light which cause the state change of a substance: a photon mode and a thermal mode. An "optical information recording medium" in the specification of the present invention includes a medium in which recording is performed in either mode.

A phase change type recording medium is known. In a method using the phase change type recording medium is known for recording/reproducing information, a change of the state of a recording film material with laser light irradiation is utilized, so as to induce or detect the change in the amount of reflected light according to the change of the state. In general, the phase change type recording medium records/reproduces information utilizing the difference in optical constants (complex refractive indices) between a region in an amorphous state (=an amorphous phase) and a region in a crystalline state (=a crystalline phase). The reflectance of an optical disk including a recording layer depends on the complex refractive index of the recording layer. Therefore, the amount of reflected light changes as the complex refractive index changes.

The amount of the reflected light reaching a detection system changes due to: (1) the difference between the reflectance of the fine recording region and that of the periphery thereof; and/or (2) the interference phenomenon caused by the phase difference of the reflected light between the fine recording region and the periphery thereof.

The phase change type recording medium is generally designed so that a signal is reproduced by utilizing the reflectance difference between the region in a crystalline state of the material in the recording layer and the region in an amorphous state. A method for positively utilizing the phase difference between the light reflected from the region in the crystalline state and the light reflected from the region in the amorphous state (Japanese Laid-Open Patent Publication No. 2-73537) and a method for utilizing both the difference in reflectance and the phase difference (Japanese Laid-Open Patent Publication No. 5-128589) have been proposed.

The phase change type recording medium is advantageous in that information can be recorded without deforming a recording film and the information can be rewritten by reversibly changing the state of the recording film material. Therefore, the phase change type recording medium has been vigorously studied in recent years.

As a phase change recording material, chalcogen alloys such as the GeSbTe system, InSbTe system, GeSnTe system, InSe system and SbTe system are well-known. After being melted by laser irradiation with relatively high power, these materials are cooled, whereby these materials are rendered amorphous. Then, the temperature of the amorphous region is boosted to a crystallization temperature or higher by laser irradiation with a relatively low power. As a result, the amorphous region becomes a crystalline state. Therefore, information is recorded as a digital signal, for example, by assigning the amorphous state to a signal 1 and the crystalline state to a signal 0.

One of the features of the phase change type optical disk is that one-beam overwriting can be performed. In other words, while a laser spot passes over a signal track only once, the laser power intensity is modulated between the recording power and the erasing power in accordance with the signal to be recorded, whereby a new signal can be recorded while erasing a previously recorded signal. A one-beam overwriting technique is described in detail in, for example, "Japanese Journal of Applied Physics", Vol. 26 (1987) Supplemental 26-4, pp.61–66.

On the other hand, the development for realizing a high-density recording has been proceeding rapidly. For example, a method for recording a signal not only onto a guiding groove (hereinafter, referred to as a "groove") for recording a signal of an optical disk but also onto a region (hereinafter, referred to as a "land") between the grooves so as to increase the recording density has been proposed (Japanese Patent Publication No. 63-57859) (hereinafter, the method is referred to as a "land & groove recording method").

Furthermore, in this method, if the shapes of grooves such as the depth and width are limited, the crosstalk from the adjacent tracks (both the groove and the land are referred to as recording tracks, or merely as tracks, since signals are recorded onto both the groove and the land) can be remarkably reduced (Japanese Laid-Open Patent Publication No. 5-282705).

Further detailed study reveals that the following problems, which are not found in a conventional optical disk for recording a signal either onto a groove or onto a land, may occur in an optical disk including a recording layer which changes at least between the high-reflectance state and the low-reflectance state due to irradiation of laser light and the like on a substrate provided with a groove and a land.

1) The crosstalk from the adjacent track (the adjacent groove with respect to a land, and the adjacent land with respect to a groove) greatly changes depending not only on the shape of the grooves of the substrate but also on the thin film structure. In some cases, the crosstalk happens to be too large to be put into practical use.

2) In some cases, the qualities of the reproduced signal, that is, an amplitude of the reproduced signal, a carrier to noise ratio (hereinafter, referred to as "CNR") or the like of the information recorded onto the groove are remarkably different from those of the information recorded onto the land. Thus, in such a case, it disadvantageously requires a signal processing means for equalizing the reproduced signal needs to be provided after reproducing the information which is recorded onto the land and the groove.

3) The qualities of the reproduced signal of the information recorded onto the groove and those of the reproduced signal of the information recorded onto the land are on the same level at the time of the initial recording. In the case where overwriting has been repeatedly performed however, the deterioration in quality of the reproduced signal from the information recorded onto the land tends to be larger than that from the information recorded onto the groove.

In the specification, a groove is defined as a portion which projects to the laser light irradiation side, and a land is defined as a portion which projects to the side opposite to the laser light irradiation side. Normally, the laser light is irradiated onto the recording layer through the substrate. However, the present invention is applicable even to the case where the laser light is irradiated onto the recording layer from the side opposite to the substrate, as long as the case follows the definition.

SUMMARY OF THE INVENTION

The optical information recording medium of this invention includes: a substrate including a groove having a concave shape and a land having a convex shape adjacent to the groove; and a recording layer on the substrate, wherein the recording layer consists of a material which changes between a first state and a second state whose optical property is different from that of the first state, a first portion of the optical information recording medium including a portion in the first state of the recording layer having a first reflectance, and a second portion of the optical information recording medium including a region in the second state of the recording layer having a second reflectance which is different from the first reflectance, whereby information is recorded onto the groove and the land, and wherein a ratio of the first reflectance to the second reflectance, a phase of reflected light from the first portion and a phase of reflected light from the second portion are set such that at least one of an amplitude and a carrier to noise ratio (CNR) of a signal obtained by reproducing information from the groove is approximately identical to that from the land.

In one embodiment of the invention, a difference D in height between the groove and the land satisfies a relation expressed by: $\lambda/(8n)<D<\lambda/(4n)$, where a width of the groove is wider than that of the land, a wavelength of the reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $2m\pi<\phi1-\phi2<(1+2m)\pi$ (m is an integer), where the phase of the reflected light from the first portion is $\phi1$, and the phase of the reflected light from the second portion is $\phi2$.

In another embodiment of the invention, a difference D in height between the groove and the land satisfies a relation expressed by: $\lambda/(8n)<D<\lambda/(4n)$, where a width of the groove is approximately identical to that of the land, a wavelength of reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $2m\pi<\phi1-\phi2<(1+2m)\pi$ (m is an integer), where the phase of the reflected light from the first portion is $\phi1$, and the phase of the reflected light from the second portion is $\phi2$.

In still another embodiment of the invention, the substrate is duplicated from a stamper previously having a convex portion and a concave portion on a surface, the substrate being fabricated so that a land face of the substrate corresponds to a transcription face of a resist face of a glass master disk for fabricating the stamper and a groove face corresponds to a transcription face of a glass face of the glass master disk, a difference D in height between the groove and the land satisfies a relation expressed by: $\lambda/(8n)<D<\lambda/(4n)$, where a wavelength of reproducing light is $\lambda$ and a reflectance of the substrate is n, a relation expressed by: $0 \leq R2/R1 \leq 0.2$ is satisfied, where the first reflectance is R1 and the second reflectance is R2, and a relation expressed by: $2m\pi<\phi1-\phi2<(1+2m)\pi$ (m is an integer), where the phase of the reflected light from the first portion is $\phi1$, and the phase of the reflected light from the second portion is $\phi2$.

In still another embodiment of the invention, the substrate is reproduced by an injection method from a stamper previously having a convex portion and a concave portion on the surface, a difference D in height between the groove and the land satisfies a relation expressed by: $\lambda/(8n)<D<\lambda/(4n)$, where a wavelength of reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $2m\pi<\phi1-\phi2<(1+2m)\pi$ (m is an integer), where the phase of the reflected light from the first portion is $\phi1$, and the phase of the reflected light from the second portion is $\phi2$.

In still another embodiment of the invention, a difference D in height between the groove and the land satisfies a relation expressed by: $\lambda/(8n)<D<\lambda/(4n)$, where a width of the land is wider than that of the groove, a wavelength of reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $(2m-1)\pi<\phi1-\phi2<2m\pi$ (m is an integer), where the phase of the reflected light from the first portion is $\phi1$, and the phase of the reflected light from the second portion is $\phi2$.

In still another embodiment of the invention, a difference D in height between the groove and the land satisfies a relation expressed by: $\lambda/(8n)<D<\lambda/(4n)$, where a width of the groove is approximately identical to that of the land, a wavelength of reproducing light is $\lambda$ and a refractive index of the substrate is n, and the second reflectance R2 is approximately 0%.

In still another embodiment of the invention, a difference D in height between the groove and the land satisfies a relation expressed by: $\lambda/(8n)<D<\lambda/(4n)$, where a width of the groove is approximately identical to that of the land, a wavelength of reproducing light is $\lambda$ and a refractive index of the substrate is n, and a relation expressed by: $\phi1-\phi2=(1+2m)\pi$ (m is an integer), where the phase of the reflected light from the first portion is $\phi1$, and the phase of the reflected light from the second portion is $\phi2$.

In still another embodiment of the invention, a difference D in height between the groove and the land satisfies a relation expressed by: $\lambda/(8n)<D<\lambda/(4n)$, where a width of the groove is approximately identical to that of the land, a wavelength of reproducing light is $\lambda$ and a refractive index of the substrate is n, and a relation expressed by: $\phi 1-\phi 2=2m\pi$ (m is an integer), where the phase of the reflected light from the first portion is $\phi 1$, and the phase of the reflected light from the second portion is $\phi 2$.

In still another embodiment of the invention, the substrate is duplicated from a stamper previously having a convex portion and a concave portion on a surface, the substrate being fabricated such that a groove face of the substrate corresponds to a transcription face of a resist face of a glass master disk for fabricating the stamper and a land face corresponds to a transcription face of a glass face of the glass master disk, a difference D in height between the groove and the land satisfies a relation expressed by: $\lambda/(8n)<D<\lambda/(4n)$, where a wavelength of reproducing light is $\lambda$ and a reflectance of the substrate is n, a relation expressed by: $0 \leq R2/R1 \leq 0.2$ is satisfied, where the first reflectance is R1 and the second reflectance is R2, and a relation expressed by: $(2m-1)\pi<\phi 1-\phi 2<2m\pi$ (m is an integer), where the phase of the reflected light from the first portion is $\phi 1$, and the phase of the reflected light from the second portion is $\phi 2$.

In still another embodiment of the invention, the difference D in height between the groove and the land satisfies a relation: $\lambda(8n)<D \leq \lambda/(5n)$.

In still another embodiment of the invention, the difference D in height between the groove and the land satisfies a relation: $\lambda/(7n) \leq D \leq \lambda/(5n)$.

In still another embodiment of the invention, the material which consists of the recording layer reversibly changes between the first state and the second state due to light irradiation.

In still another embodiment of the invention, the first state and the second state belong to different phases.

In still another embodiment of the invention, a first dielectric layer, the recording layer, a second dielectric layer and a reflective layer are formed on the substrate in this order.

In still another embodiment of the invention, m in the relation is 0.

Thus, the invention described herein makes possible the advantages of providing an optical information recording medium in which at least one of qualities of an amplitude or a carrier to noise ratio (CNR) of a signal obtained by reproducing information recorded onto the optical information recording medium is approximately the same for a signal recorded onto the groove and for a signal recorded onto the land.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described with reference to the drawings.

Figure 1:
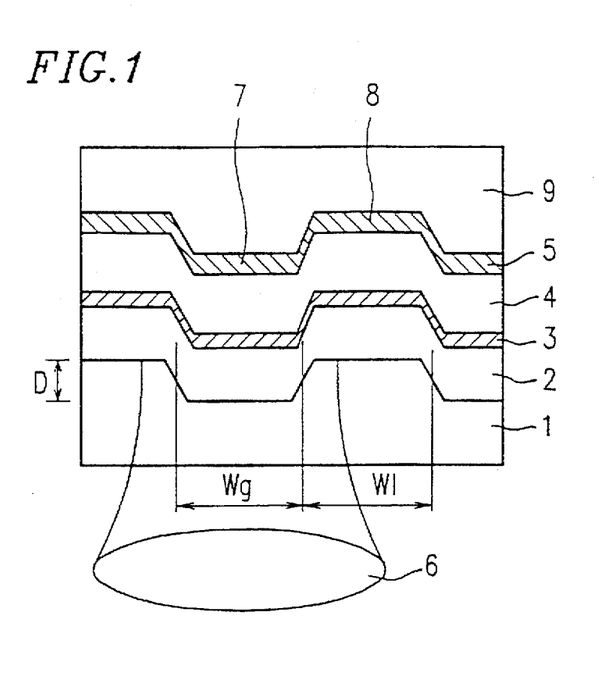
FIG. 1 is a cross-sectional view taken along a radial direction for illustrating an example of a recording medium according to the present invention.
Figure 2A:
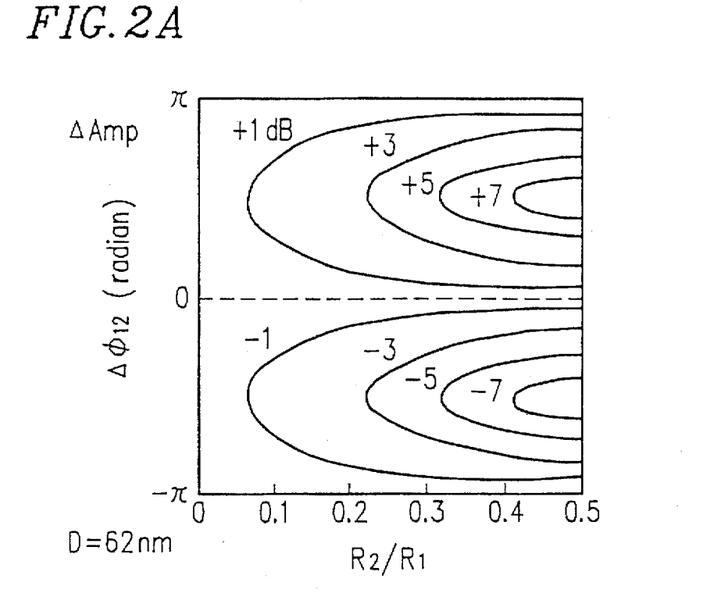
FIGS. 2A and 2B are graphs showing the relationship between the disk characteristics and a reflectance difference and a phase difference in the case where a groove depth is $\lambda/(8n)$ in an example according to the present invention.
Figure 2B:
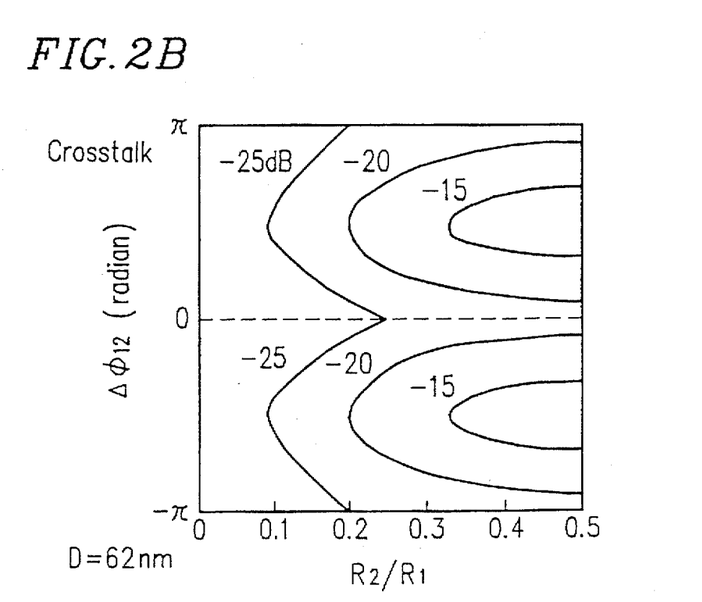
Figure 3A:
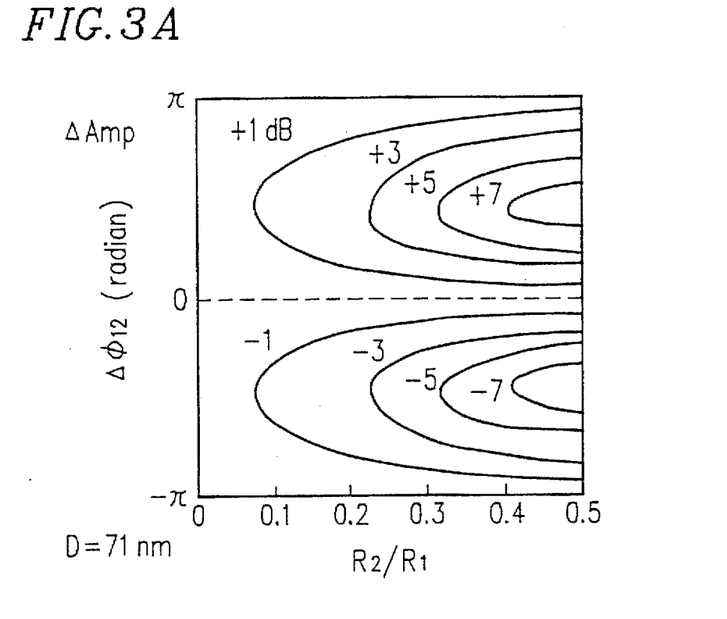
FIGS. 3A and 3B are graphs showing the relationship between the disk characteristics and a reflectance difference and a phase difference in the case where a groove depth is $\lambda/(7n)$ in an example according to the present invention.
Figure 3B:
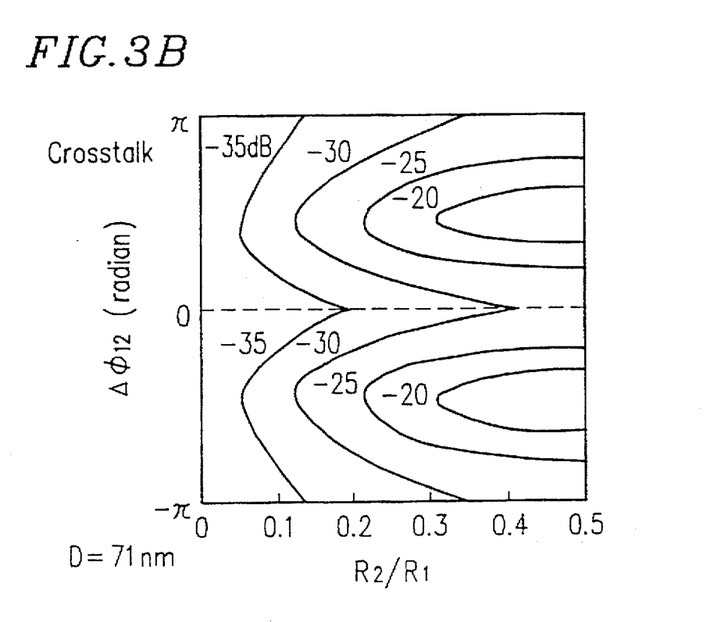
Figure 4A:
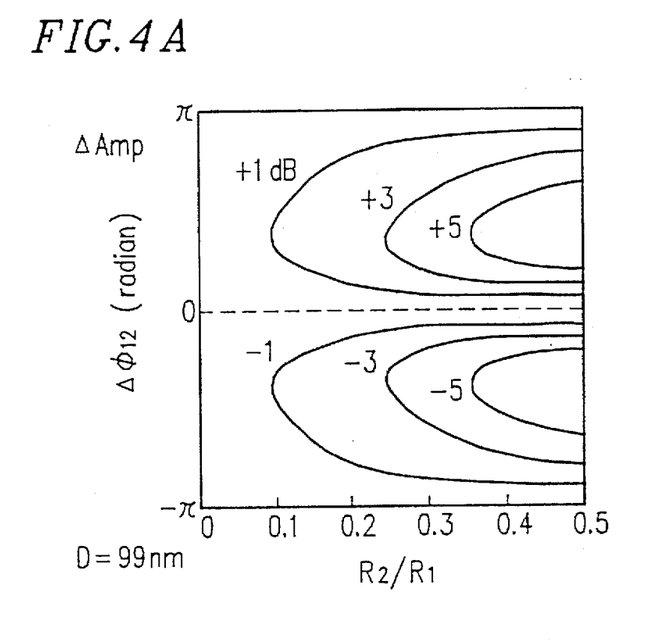
FIGS. 4A and 4B are graphs showing the relationship between the disk characteristics and a reflectance difference and a phase difference in the case where a groove depth is $\lambda(5n)$ in an example according to the present invention.
Figure 4B:
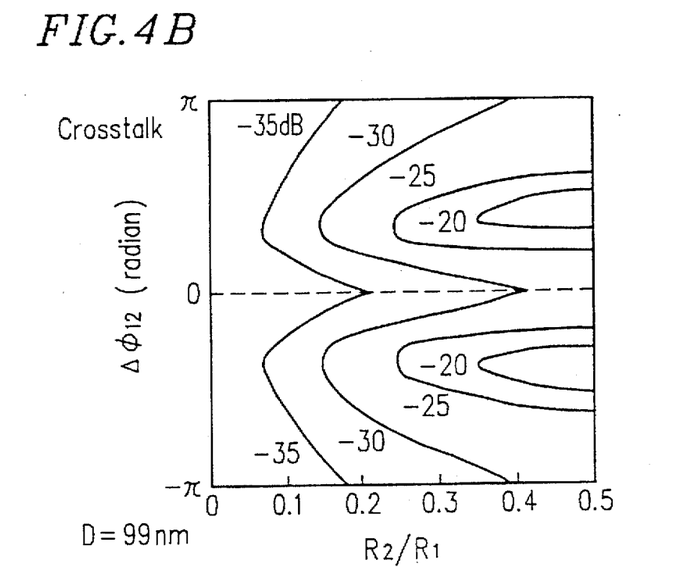

FIG. 1 is a cross-sectional view in a radial direction showing an example of an optical disk of the present invention. A groove 7 and a land 8 is provided on a surface of a substrate 1 as tracks (signal tracks) for recording information.

Generally, a transparent material, such as glass, quartz, polycarbonate, polymethylmethacrylate or the like is used as the material of the substrate 1. A laser beam is incident on the side opposite to the signal track face (the substrate side) of the substrate 1.

A first dielectric layer 2, a recording layer 3, a second dielectric layer 4 and a reflective layer 5 are deposited on the substrate 1 in this order. A protective cover 9 for protecting a thin film layer may be formed on the reflective layer 5 if necessary.

The recording layer 3 consists of a material whose optical properties reversibly change due to irradiation of a laser beam and the like, for example, a material which is generally known as a phase change material.

As the phase change material, an alloy including Te, Se, Sb, In, Ge or the like is known. The alloy causes the state change (phase change) between the amorphous phase and the crystalline phase, or between one crystalline phase and another crystalline phase. Each of the alloys has a different complex refractive index (which is one of the optical constants) in the amorphous state. Therefore, the state of alloy is optically distinguishable. Specifically, an alloy such as GeSbTe, InSbTe, InSbTeAg, GaSb, InGaSb, GeSnTe or AgSbTe may be used.

It is preferred that the first dielectric layer 2 and the second dielectric layer 4 consist of a thermally stable transparent substance, for example, oxide of a metal or a semimetal, nitride, chalcogenide, fluoride, carbide, and a mixture thereof. Specifically, for example, single substances such as $SiO_2$, SiO, $Al_2O_3$, $GeO_2$, $In_2O_3$, $Ta_2O_5$, $TeO_2$, $TiO_2$, $MoO_3$, $WO_3$, $ZrO_2$, $Si_3N_4$, AlN, BN, TiN, ZnS, CdS, CdSe, ZnSe, ZnTe, AgF, $PbF_2$, $MnF_2$, $NiF_2$, SiC or a mixture thereof may be used.

The reflective layer 5 consists of a metal film. As a material of the reflective layer 5, single substances such as Au, Al, Ti, Ni, Cu and Cr or an alloy thereof may be used.

It is possible to provide the optical disk with a structure without the reflective layer 5 by suitably designing the thicknesses of the first dielectric layer 2, the recording medium 3 and the second dielectric layer 4. Other thin film structures may be applicable to the structure of thin film layers of the optical disk of the invention.

In the case where a signal is reproduced by utilizing the change in reflectance, Japanese Laid-Open Patent Publication No. 5-282705 discloses that the crosstalk can be reduced by limiting the depth of the groove even if signals are recorded both onto a land and onto a groove as in FIG. 1. Japanese Laid-Open Patent Publication No. 5-282705 also discloses the following method for reducing the crosstalk. In order to suppress the crosstalk amount at −20 dB or less, it is sufficient to set a depth of a groove D, so as to satisfy a relationship expressed by: $\lambda/(7n) \leq D \leq 5\lambda/(14n)$, where $\lambda$ is the wavelength of a reproducing light, and n is the refractive index of the substrate. Furthermore, when the depth D is set to be about $\lambda/(5n)$ or about $3\lambda/(10n)$, the crosstalk is reduced to a minimum.

Even in the case where the geometrical (physical) depth of the groove is the same, the optical depth of the groove changes depending on the wavelength $\lambda$ of the reproducing light and the refractive index n of the constituent material. Therefore, all the depths D of the grooves in the present invention are defined by the optical depths. The depth D of the groove represents the height difference between the groove and the land.

The inventors of the present invention have fabricated phase change type optical disks, which reversibly conduct the phase change between the amorphous phase and the crystalline phase having various depths of a groove, and have examined the recording and reproducing characteristics and the crosstalk characteristics thereof, taking the teachings of the publication into consideration. As a result, the above-mentioned problems peculiar to the land & groove recording method have been found.

The inventors have examined the above problems in detail. As a result, it has been found that the above-mentioned problems 1) and 2) are caused by the phase difference between the reflected light from the portion of the optical disk including a recording layer in the amorphous state (an amorphous portion) and the reflected light from the portion of the optical disk including a recording layer in the crystalline state (crystalline layer), the difference in width between the groove and the land, the noise difference between the groove and the land and the like.

Although it is not clear why the problem 3) of difference in the quality of the reproduced signal after overwriting cycles is caused, it is considered that it may be the difference in thermal characteristics between the land and the groove. In other words, the groove and the land have different geometric structures. For example, while the groove projects toward the side on which the laser light is incident, the land projects toward the side opposite to the laser light irradiation side. Therefore, it is considered that the heating process and heat radiating process of the recording film of the land are different from those of the groove during laser light irradiation.

The present invention is designed so as to solve these problems described above. In the present invention, a reflectance ratio before and after performing recording on the recording medium and the difference between the phase of reflected light in the high reflectance state and the phase of reflected light in the low reflectance state are defined so that the quality of the reproduced signal from the groove is approximately identical to that of the reproduced signal from the land.

For example, in the optical information recording medium provided with a recording medium changing between the high reflectance state and the low reflectance state, the depth D of the groove is set so as to satisfy the following relation: $\lambda/(8n)<D<\lambda/(4n)$, where $\lambda$ is a wavelength of the reproducing light and n is a refractive index of the substrate and to satisfy the following relation: $0 \leq R2/R1 \leq 0.2$, where R1 is a reflectance in the higher reflectance state of the recording layer and R2 is a reflectance in the lower reflectance state of the recording layer.

With such a definition, even if the difference between the phase of the reflected light in the high reflectance state and that in the low reflectance state is within range, the crosstalk level between the adjacent tracks can be reduced to −20 dB or lower. Furthermore, it is found that the difference in amplitude between a reproduced signal from the land and a reproduced signal from the groove can be reduced to a small value.

In the case of R2/R1>0.2, the amount of the crosstalk sometimes exceeds −20 dB. The reason for this is considered to be as follows. The interference between the reflected light from a recording mark, and the reflected light from the adjacent track increases as the reflectance within the recording mark (the lower reflectance) increases. As a result, the reflected light from the recording mark affects the intensity of a reproduced signal from the adjacent track, depending on the phase of the reflected light from the recording mark.

Furthermore, it is found that the difference in quality between a signal reproduced from the land and a signal reproduced from the groove, and the deterioration in quality of the signal reproduced from the land, which is caused by overwriting cycles, can be reduced by controlling the difference between a phase $\phi1$ of the reflected light in the high reflectance state and a phase $\phi2$ of the reflected light in the low reflectance state, i.e., $\phi1-\phi2$ (hereinafter, referred to as "$\Delta\phi12$").

For example, an amplitude of the reproduced signal from the land becomes larger than that from the groove, in the case where the width of the land is identical with that of the groove by designing the thin film structure so as to satisfy: $2m\pi < \Delta\phi12 < (1+2m)\pi$ (m is an integer).

This phenomenon is also caused by the interference of the reflected light from the recording mark with the reflected light from the adjacent track. The present invention utilizes this phenomenon in order to solve the problems of the land & groove recording method. If $\Delta\phi12$ is selected within the above range so as to increase the amplitude of the reproduced signal from the land, in the case where the signal quality of the land is inferior to that of the groove, for example: (1) in the case where the land width of the substrate is narrower than the groove width; or (2) in the case where the noise level of substrate from the land is higher than that from the groove, the signal quality of the land and that of the groove can be enhanced and equalized to each other. As a result, it is found that a recording medium suitable for the land & groove recording method may be obtained.

The above-mentioned limitation of $\Delta\phi12$ is effective also for compensating the deterioration of a signal from the land, which is caused by repeating overwriting as described in the above problem 3). In the land & groove recording method, even if the CNR of the groove and that of the land are on the same level at the time of the initial recording, the CNR of the reproduced signal from the land begins to decrease with an increase of noise at an earlier stage than the groove. In other words, the degree of the signal quality deterioration of the land is greater than that of the groove. In such a case, the cycle life of the recording medium is determined by the lowered CNR of the land.

Thus, $\Delta\phi12$ is defined within the above range, and a thin film structure is designed at the initial recording stage so that the amplitude of reproduced signal from a land is slightly greater than that from a groove. With such a structure, although the initial CNR of the groove is slightly lowered, the initial CNR of the land increases. As a result, the degree of decrease in CNR of land due to overwriting cycle is reduced. In other words, it is possible to design the thin film structure so that the signal qualities of the land and the groove are equivalent to each other after conducting a large number of overwriting cycles. As a result, a recording medium including the land and the groove both having a long cycle life can be provided.

If the thin film structure is designed so as to satisfy the following relation: $(2m-1)\pi < \Delta\phi 12 < 2m\pi$ (m is an integer), the amplitude of a reproduced signal from the groove becomes greater than that from the land in the case where the land width is identical to the groove width. When $\Delta\phi 12$ is selected within the above range so as to increase the amplitude of a reproduced signal from the groove, in the case where the signal quality of the groove is inferior to that of the land, for example: (1) in the case where the groove width of the substrate is narrower than the land width; and (2) in the case where the noise level of the substrate from the groove is higher than that from the land, the signal quality from the groove and that from the land can be equivalent to each other. As a result, a recording medium suitable for a land and groove recording method can be obtained.

The way to obtain the reflectance and the phase of light from a region in the amorphous state and those of light from a region in the crystalline state will be described.

A method for calculating the reflectance of a light beam and the phase of the reflected light from a thin film layered structure as in FIG. 1 is known as, for example, a matrix method. Also in the present invention, the reflectance and the phase are calculated by the matrix method from a complex refractive index and a thickness of each layer (see, for example, Chapter 3, "Wave Optics" written by Hiroshi Kubota, Iwanami Shoten, 1971). In the specification, a reflected light or a reflectance means a reflected light or a reflectance from a thin film layered structure composing an optical disk (including a recording layer). The change in reflectance accompanying the state of change of a material which constitutes the recording layer indicates a reflectance regarding a reflected light from the entire thin film layered structure (excluding a substrate and a protective layer) including the recording layer region whose state has changed, rather than a reflectance regarding a reflected light from the recording layer.

Herein, the substrate 1 and the protective cover 9 are regarded as having infinite thicknesses (the effects of the interface of the substrate/air and the interface of adhesive protective layer/air are ignored). The reflectance is obtained as a ratio of the light entering from the substrate to the light outputting to the substrate. The phase is obtained with reference to the phase at the interface between the substrate 1 and the first dielectric layer 2.

As the complex refractive index of the recording layer, a complex refractive index of a GeSbTe ternary system film in the amorphous state formed on a glass substrate by sputtering, and a complex refractive index of a crystalline GeSbTe which is obtained by crystallizing the amorphous film with a heat treatment in an inert gas at 300° C. for 5 minutes are used.

The fabrication process of the substrate greatly affects where the noise of the substrate becomes high, that is, the groove or the land. The level of the substrate noise is an important factor related to the present invention, and therefore, will be described in detail. Furthermore, the definition of the noise level in the present invention will be described.

In general, a disk substrate is duplicated from a stamper previously provided with a groove by an injection method (injection molding method) or a 2P method (Photopolymerization method).

Figure 6:
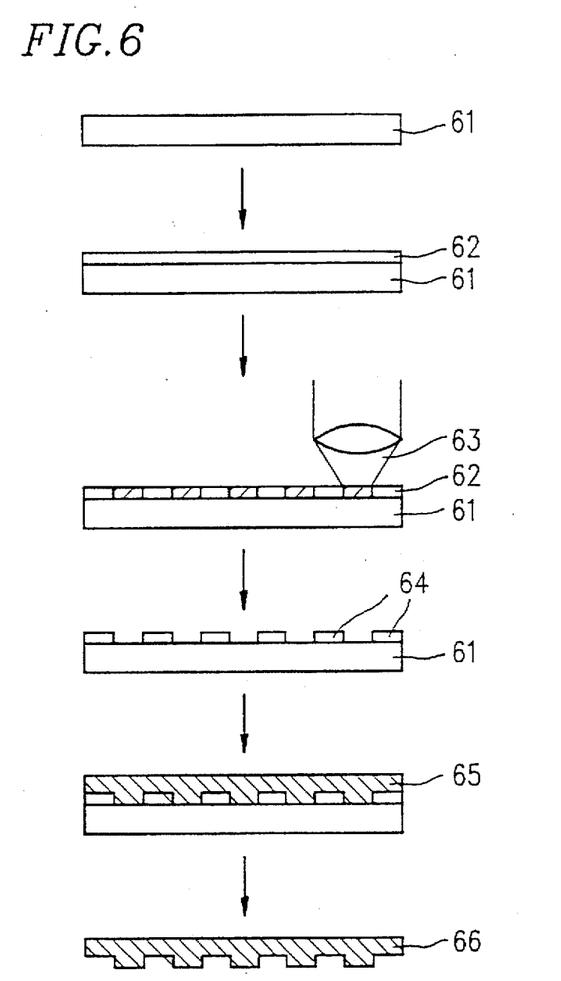
FIG. 6 is a cross-sectional view showing the general fabrication process of a stamper of an example according to the present invention.

The stamper is fabricated as follows. First, as shown in FIG. 6, a glass plate 61, which is sufficiently polished, is prepared. A photoresist 62 is applied to on the polished surface of the glass plate 61, and then, grooves are recorded on the photoresist 62 by irradiating a laser beam 63. Then, convex portions 64 are formed by developing the irradiated photoresist 62, thereby obtaining the glass master disk.

After a conductive film 65 is formed on the entire surface of the glass master disk by, for example, electroless deposition or sputtering, a stamper 66 made of nickel and the like is produced by an electrocast process.

A disk substrate is duplicated based on the stamper 66. At that time, the faces of the grooves of the disk substrate correspond to transcription faces of the polished surface of the glass plate 61, and the faces of the lands correspond to transcription faces of the photoresist 62. While the surface of the glass plate is sufficiently polished so as to be mirror-finished, the surface of the photoresist 62 has to some extent an unevenness. As a result, although the groove face of the disk substrate is mirror-finished, the land face has an unevenness, causing a noise for reproduced signals.

Although only one stamper is obtained from the glass master disk according to the above fabrication method of the stamper, another method for obtaining a plurality of stampers is applicable. In such a method, a plurality of stampers are obtained by further repeating the electrocast process based on the stamper 66. The grooves of the disk substrate, which is finally produced, may correspond to the photoresist face. In such a case, the groove noise is higher than the land noise.

In the case where the disk substrate is produced by an injection method, greater noises may be generated from the land than the groove. In the injection method, a melted resin is injected into a mold including the stamper of the disk at high pressure, and is solidified in the mold. If the shape of the stamper cannot be perfectly transcribed to the disk substrate because of insufficient flow of the resin toward the concave portions of the stamper, the shape of the land portion of the produced substrate is not uniform, causing a noise for reproduced signals.

In particular, since an optical disk substrate used for the land & groove recording method has deeper grooves than a conventional one, the land noise due to poor transcription is likely to occur.

As described above, the difference in noise levels may occur between the land and the groove in accordance with the fabrication method of the substrate. Even in such a case, the quality of the signal from the land can be equivalent to that from the groove by setting $\Delta\phi 12$ so that a signal amplitude reproduced from either the land or the groove, which has the higher noise level than that of the other, increases.

The noise from the land and that of the groove of the disk substrate can be compared to each other as follows. A disk substrate before forming a thin film thereon is disposed on a signal recording/reproducing apparatus. The disk substrate is rotated at the same speed as in the case where a signal is reproduced, and is scanned on the lands or on the grooves while conducting the focus control and the tracking control.

The reproduced signal is led to a spectrum analyzer so as to measure the noise level of the recorded signal band.

In the recorded signal band, the noise level broadly changes with the land and the groove. Therefore, the noise of the land and that of the groove are easily compared to each other by selecting one frequency in the recorded signal band and comparing the noise levels to each other at the frequency. For example, the frequency, in the case where the length of the recorded mark is 1 μm (a mark pitch of 2 μm), is generally included in the recorded signal band of the optical disk. Assuming that a relative speed between a reproducing laser spot and the substrate is V (m/s), the frequency is represented as V/2 (MHz). Therefore, by measuring the noise level at this frequency, it is possible to determine the noise level difference between the land and the groove.

Next, a groove depth of the disk substrate, a reflectance ratio of an unrecorded portion to a recorded portion and a phase difference in reflectance between the light reflected from the unrecorded portion and that from the recorded portion will be described by way of illustrative examples defined within the above range.

EXAMPLE 1

The structure of an optical disk is the same as that shown in FIG. 1. Three types of disk substrates (injection substrates), which are made of polycarbonate and have different groove depths, are prepared by the injection method. The groove depths are 62 nm, 71 nm and 99 nm, respectively. These values correspond to $\lambda/(8n)$, $\lambda/(7n)$ and $\lambda/(5n)$, respectively, in the case where a refractive index n of polycarbonate is 1.58 and a wavelength $\lambda$ of a laser beam is 780 nm.

The thus produced optical disk is evaluated by a recording/reproducing apparatus using a semiconductor laser having a wavelength $\lambda$ of 780 nm as a light source. Hereinafter, the following refractive indices and the like are represented by values for light with the wavelength of $\lambda=780$ nm unless there is an explanatory note explaining other values. The groove width $W_g$ and the land width $W_l$ are equal to each other as shown in FIG. 1, i.e., 0.8 μm, respectively.

A composite material, in which $SiO_2$ of 20 mol % is added to ZnS, is used as a material of the dielectric layer. The refractive index of the composite material is 2.1. As a recording material, a ternary system of GeSbTe is used. A complex refractive index is 4.41-i1.34 in its amorphous state, 5.52-i4.00 in its crystalline state. As a reflective layer, both Au and Al are used. A complex refractive index of Au is 0.18-i4.64, and a complex refractive index of Al is 2.18-i6.80.

A first dielectric layer, a recording layer, a second dielectric layer, and a reflective layer are deposited on each of the disk substrates of three types so as to have a various thickness. As a result, various kinds of optical disks, which have different reflectance ratios of the recorded portion (in the amorphous state) to the unrecorded portion (in the crystalline state) and different phase differences between a reflected light from the recorded portion and a reflected light from the unrecorded portion, are produced.

Table 1 shows the thin film structures of the produced samples, reflectance ratios R2/R1 between the portions in the amorphous state to that in the crystalline state and the phase differences $\Delta\phi12$ between the respective reflected light from the respective portions, which are obtained by a matrix method with respect to each of the thin film structures. The amplitude ratio of a reproduced signal from the land to a reproduced signal from the groove and the crosstalk amount depend on the reflectance ratio R2/R1 rather than absolute values of the reflectances R1 and R2. Therefore, the values of the reflectance ratios are shown in Table 1.

The phase difference $\Delta\phi12$ shows the phase difference of the reflected light from a portion in the crystalline state, with reference to the phase of the reflected light from a portion in the amorphous state. In the case where the phase of the reflected light from the crystalline state is ahead, the phase difference is represented by a positive number. In the case where the phase of the reflected light from the crystalline portion is behind, the phase difference is represented by a negative number. Since the phase difference is equivalent with a $2\pi$ cycle, the phase difference is represented in the range of $-\pi$ to $+\pi$.

Since the recording layer is in amorphous state immediately after forming the layer, a laser beam is previously irradiated onto the entire surface of the optical disk so as to crystallize the entire recording layer of the optical disk, thereby initialize the optical disk.

TABLE 1

| Thin film structure No. | First dielectric layer (nm) | Recording layer (nm) | Second dielectric layer (nm) | Reflective layer (nm) | R2/R1 | $\Delta\phi12/\pi$ (RAD) |
|---|---|---|---|---|---|---|
| 1 | 91 | 20 | 10 | Al:100 | 0.36 | +0.56 |
| 2 | 91 | 20 | 18 | Al:100 | 0.18 | +0.79 |
| 3 | 91 | 20 | 25 | Al:100 | 0.18 | −0.93 |
| 4 | 91 | 20 | 33 | Al:100 | 0.27 | −0.74 |
| 5 | 91 | 30 | 10 | Al:100 | 0.01 | −0.79 |
| 6 | 91 | 30 | 18 | Al:100 | 0.08 | −0.46 |
| 7 | 91 | 30 | 25 | Al:100 | 0.20 | −0.40 |
| 8 | 91 | 30 | 33 | Al:100 | 0.31 | −0.37 |
| 9 | 91 | 20 | 10 | Au:50 | 0.34 | +0.88 |
| 10 | 91 | 20 | 18 | Au:50 | 0.32 | −0.90 |
| 11 | 91 | 20 | 25 | Au:50 | 0.41 | −0.73 |
| 12 | 91 | 30 | 10 | Au:50 | 0.14 | −0.51 |
| 13 | 91 | 30 | 18 | Au:50 | 0.25 | −0.43 |
| 14 | 91 | 30 | 25 | Au:50 | 0.37 | −0.38 |
| 15 | 91 | 30 | 33 | Au:50 | 0.48 | −0.34 |
| 16 | 151 | 15 | 18 | Al:100 | 0.43 | +0.33 |
| 17 | 151 | 15 | 25 | Al:100 | 0.17 | +0.45 |
| 18 | 151 | 15 | 33 | Al:100 | 0.04 | +0.64 |
| 19 | 172 | 15 | 18 | Al:100 | 0.28 | +0.32 |
| 20 | 172 | 15 | 25 | M:100 | 0.06 | +0.40 |
| 21 | 163 | 20 | 12 | Au:50 | 0.01 | +0.22 |
| 22 | 174 | 20 | 12 | Au:50 | 0.01 | −0.03 |
| 23 | 186 | 20 | 12 | Au:50 | 0.02 | −0.22 |
| 24 | 186 | 20 | 186 | Au:20 | 0.11 | +0.08 |
| 25 | 151 | 20 | 186 | Au:20 | 0.13 | +0.18 |
| 26 | 197 | 20 | 186 | Au:20 | 0.09 | −0.03 |
| 27 | 139 | 20 | 163 | Au:10 | 0.38 | +0.08 |
| 28 | 116 | 20 | 163 | Au:10 | 0.29 | +0.11 |
| 29 | 174 | 20 | 186 | Au:10 | 0.24 | −0.08 |
| 30 | 174 | 20 | 23 | Au:10 | 0.39 | −0.17 |
| 31 | 104 | 20 | 163 | Au:10 | 0.23 | +0.13 |
| 32 | 93 | 20 | 163 | Au:10 | 0.17 | +0.12 |
| 33 | 232 | 20 | 174 | Au:10 | 0.17 | −0.13 |

The amplitude difference of the reproduced signal and the crosstalk are evaluated for the optical disk, in which a signal is recorded both onto the land and onto the groove, by using a recording/reproducing apparatus having a light source with a wavelength of 780 nm and an objective lens with a numerical aperture (NA) of 0.55.

The recording and reproducing of the signal are evaluated by the following procedure. The optical disk is installed in the recording/reproducing apparatus. Then, a spindle motor is rotated at a linear velocity of 5 m/s. A light beam emitted from a semiconductor laser is converged to a minute optical spot by an optical system, and is irradiated onto the recording thin film layer. While the focus control and the tracking control are performed, the laser spot is tracked onto the groove at first.

A laser driving circuit is driven at a single frequency of 3 MHz, thereby modulating the power of the laser beam between the peak power (recording power) and the bias power (erasing power). In this way, a signal is recorded on the successive two grooves. Since the recording sensitivity varies depending on the thin film structure, the peak power is set to the value at which the recording amplitude is saturated, and the bias power is set to the value at which the overwriting erasing rate becomes a maximum.

Next, the polarity of tracking is inverted. The tracking is performed on the land between the two grooves on which signal is recorded by the laser spot. Then, an amplitude of the reproduced signal of 2.5 MHz and the crosstalk of 3 MHz from the adjacent grooves on the both sides are measured.

Subsequently, a signal of a single frequency of 3 MHz is recorded on two successive lands. The polarity of the tracking is inverted again. The laser spot is tracked onto the groove between the two lands on which the signal is recorded, thereby recording the signal of 2.5 MHz. Then, an amplitude of the reproduced signal of 2.5 MHz and the crosstalk of 3 MHz from the grooves on both sides are measured.

In the above manner, the difference in amplitude of the reproduced signal between the land and the groove and the crosstalk amount are examined with respect to all of the thin film structures. FIGS. 2A through 4B show the relationship between the difference in the amplitude of the reproduced signals, the reflectance ratios R2/R1 and the phase differences $\Delta\phi 12$, and the relationship between the crosstalk amount the reflectance ratios R2/R1 and the phase differences $\Delta\phi 12$.

FIGS. 2A, 2B, 3A, 3B, 4A and 4B correspond to the cases where the groove depths of the disk substrate are 62 nm, 71 nm and 99 nm, respectively. The amplitude difference of the reproduced signal $\Delta Amp$ (dB) is obtained by subtracting the amplitude for the groove from the amplitude obtained for the land. Therefore, if $\Delta Amp$ (dB) is a positive number, the amplitude obtained for the land is greater than that obtained for the groove. On the contrary, if $\Delta Amp$ (dB) is a negative number, the amplitude for the groove is greater than that for the land. The crosstalk for the land and that for the groove are different from each other due to the effect of the phase difference $\Delta\phi 12$ of the signal between the amorphous portion and the crystalline portion. FIGS. 2A through 4B show the larger values (the more disadvantageous values) (generally, when the value of $\Delta\phi 12$ is positive, the crosstalk for the groove is larger than that for the land, and when the value of $\Delta\phi 12$ is negative, the crosstalk for the land is larger than that for the groove).

In FIGS. 2A through 4B, $\Delta Amp$ and the crosstalk depend on the reflectance ratio R2/R1, the phase difference $\Delta\phi 12$ and the groove depth. It is understood that some thin film structures are not suitable as recording mediums for a land & groove recording method because the crosstalk or the amplitude difference $\Delta Amp$ is too large. With the groove depths of 62 nm, 71 nm and 99 nm of Example 1, however, even if the value of $\Delta\phi 12$ changes, it is possible to hold the crosstalk amount at $-20$ dB or less and $\Delta Amp$ at 3 dB or less by selecting the value of R2/R1 within the range of $0 \leq R2/R1 \leq 0.2$. Therefore, the thin film structures exhibit good characteristics as mediums for land & groove recording.

In particular, when R2/R1=0, i.e., R2=0, the crosstalk amount is small and the amplitude of the reproduced signal can be equivalent both from the land and from the groove.

Moreover, when $\Delta\phi 12$ is 0 or $\pm\pi$ (that is, $\Delta\phi 12$ is $2m\pi$ or $(1+2m)$ (m is an integer)), the crosstalk amount is small regardless of the value of R2/R1, and the amplitude of the reproduced signal can be equivalent both from the land and from the groove.

Furthermore, when the groove depth is 71 nm ($\lambda/(7n)$) or 99 nm ($\lambda/(5n)$), the crosstalk amount is small. Moreover, even if the value of $\Delta\phi 12$ changes, it is possible to hold the crosstalk level at $-25$ dB or less by selecting the value of R2/R1 within the range of $0 \leq R2/R1 \leq 0.2$.

EXAMPLE 2

On the basis of the result shown in FIGS. 2A through 4B, it is understood that $\Delta Amp$ can be controlled by controlling the value of $\Delta\phi 12$. By utilizing this principle, it is possible to control the difference in quality of a reproduced signal from the land and from the groove, which is a problem in the land & groove recording method, and the deterioration in the quality of the reproduced signal which has been recorded on the land by the overwriting cycles. Hereinafter, illustrative examples will be described below.

Two kinds of disk substrates A and B, which are made of polycarbonate and have a groove depth of 65 nm, are prepared. In the case of the disk substrate A, the glass face of the glass master disk corresponds to the groove face, and a photoresist face corresponds to the land face due to the fabrication process. On the other hand, in the case of the substrate B, the glass face corresponds to a land face, and a photoresist face corresponds to the groove face. The groove width and the land width are equal to each other, and are 0.8 μm each.

The noise levels are measured for the disk substrates A and B. Each of the substrates is installed in the recording/reproducing apparatus used in Example 1. Each of the disk substrates is rotated at a relative speed between a laser spot for reproduction and the disk substrate of 5 m/s. In this way, the noise level at the frequency of 5/2=2.5 MHz can be measured. As a result, in the case of the disk substrate A, the noise level from the land is higher than that from the groove by 1.5 dB. On the other hand, in the case of the disk substrate B, the noise level from the groove is higher than that from the land by 1.2 dB.

The thin film structures 17 and 12 of Example 1 are deposited on the respective disk substrates A and B, thereby fabricating four optical disks. As can be seen from Table 1 and FIGS. 2A through 4B, the thin film structure 17 has a positive value of $\Delta\phi 12$ and a larger amplitude of a reproduced signal from the land than that from the groove. The thin film structure 11 has a negative value of $\Delta\phi 12$ and a larger amplitude of a reproduced signal from the groove than that from the land.

Table 2 shows the result of the evaluation in the case where a signal of 2.5 MHz is recorded on and reproduced from these optical disks. The optical disk, which has the disk substrate A provided with the thin film structure 17, has a larger amplitude of a reproduced signal from the land than that from the groove by 2.1 dB so as to compensate for high noise of the land. As a result, the same CNR is obtained for the land and for the groove. Similarly, the optical disk, which has the substrate B provided with the thin film structure 12, has a larger amplitude of a reproduced signal from the land than that of the groove by 1.9 dB so as to compensate for high noise from the groove. As a result, the same CNR is obtained for the land and for the groove.

In the case where the substrate A is provided with the thin film structure 12, CNR of the land is small because the noise level is high and the amplitude is small for the land. On the other hand, in the case where the substrate B is provided with the thin film structure 17, CNR for the groove is small because the noise level is high and the amplitude is small for the groove. Therefore, the quality of the reproduced signal from the land is different to that from the groove. As a result, the recording density and the like as a medium for land & groove recording is restricted by either a groove or a land from which the quality of a signal reproduced is inferior to the other.

As described above, a thin film structure is designed so that the following relation: $2m\pi < \Delta\phi12 < (1+2m)\pi$ (m is an integer) is satisfied (the values in Table 1 correspond to m=0) in the case where the substrate noise from the land is higher than that from the groove, and so that the following relation: $(2m-1)\pi < \Delta\phi12 < 2m\pi$ is satisfied (the values in Table 1 correspond to m=0) in the case where the substrate noise from the groove is higher than that from the land. As a result, the quality of a reproduced signal can be equivalent both from the land and from the groove, thereby providing a medium suitable for a land & groove recording method.

Also the land noise sometimes rises due to insufficient transcription from the stamper during an injection process. In this case, the thin film structures are designed so that the relation: $2m\pi < \Delta\phi12 < (1+2m)\pi$ is satisfied. As a result, the quality of a reproduced signal can be equivalent both from the land and from the groove, thereby providing a medium suitable for a land & groove recording method.

TABLE 2

| Substrate | | Thin film structure 17 | Thin film structure 12 |
| --- | --- | --- | --- |
| A | ΔAmp | +2.1dB | −1.9dB |
| | CNR: groove | 53.0dB | 54.4dB |
| | : land | 53.2dB | 50.3dB |
| B | ΔAmp | +2.0dB | −1.9dB |
| | CNR: groove | 50.5dB | 53.4dB |
| | : land | 54.1dB | 53.1dB |

EXAMPLE 3

The difference in quality between a signal from the land and a signal from the groove is also generated by the difference in width between the land and the groove. The reason for this is as follows. The width of the recorded mark is prevented from further extending in the horizontal (radial) direction due to the difference in height between the land and the groove. As a result, as the track width increases, the recorded mark width increases, thereby obtaining a large amplitude. Even in the case where the width of the land differs from that of the groove, it is possible to equalize the quality of the signal from the land with that from the groove by controlling $\Delta\phi12$ of the optical disk. Hereinafter, Example 3 regarding this point will be described.

A disk substrate C, which is made of polycarbonate and has a groove depth of 65 nm, is prepared. In the case of the disk substrate C, each zone has a different land width and a different groove width: a zone 1 has a groove width of 0.6 μm and a land width of 1.0 μm; and a zone 2 has a groove width of 1.0 μm and a land width of 0.6 μm.

The thin film structures 17 and 12 of Example 1 are formed on the disk substrate C, thereby fabricating two optical disks. In the same manner as in Example 2, Table 3 shows the result of evaluation in the case where a signal of 2.5 MHz is recorded on and reproduced from these optical disks at a linear velocity of 5 m/s. The amplitude of the reproduced signal from the land is approximately identical to that from the groove in the zone 1 provided with the thin film structure 12 and in the zone 2 provided with the thin film structure 17. Therefore, it is understood that the difference in quality of the reproduced signal due to the difference in width between the land and the groove is compensated by the thin film structure.

As described above, a thin film structure is designed so that the following relation: $2m\pi < \Delta\phi12 < (1+2m)\pi$ (m is an integer) is satisfied (the values in Table 1 correspond to m=0) in the case where the width of the groove is wider than that of the land, or so that the following relation: $(2m-1)\pi < \Delta\phi12 < 2m\pi$ (m is an integer) is satisfied (the values in Table 1 correspond to m=0) in the case where the width of the land is wider than that of the groove. As a result, the quality of a reproduced signal can be equivalent both from the land and from the groove, thereby providing a medium suitable for a land & groove recording method.

TABLE 3

| Zone | | Thin film structure 17 | Thin film structure 12 |
| --- | --- | --- | --- |
| 1 | ΔAmp | +4.1 dB | +0.3 dB |
| 2 | ΔAmp | −0.2 dB | −3.9 dB |

EXAMPLE 4

The optical disk is required to perform for a number of times of rewriting (overwriting) depending on its use. In the land & groove recording method using the phase change type optical disk, as described above, the degree of decrease in CNR of land due to overwriting cycle is larger than that in CNR of groove.

It is understood that this problem can be solved by controlling the $\Delta\phi12$ of the optical disk so as to equalize the quality of the signal on the land with that on the groove after a number of overwriting cycles. As a result, the overwriting cycle life can be prolonged. Hereinafter, Example 4 regarding this point will be described.

A disk substrate, which is made of polycarbonate and has a groove depth of 71 nm, is prepared. The groove width and the land width are equal to each other, i.e., 0.8 μm each. In the case of this disk substrate, the noise level are approximately the same for the land and for the groove. The thin film structures 17 and 23 of Example 1 are deposited on this disk substrate, thereby fabricating two optical disks.

As can be seen from Table 1 and FIGS. 2A through 4B, the thin film structure 17 has a positive value of $\Delta\phi12$, and an amplitude of a reproduced signal from the land is larger than that from the groove. The thin film structure 23 has a negative value of $\Delta\phi12$. While it also has a small value of R2/R1, an amplitude of a reproduced signal from the groove is substantially equal to that from the land.

Figure 5A:
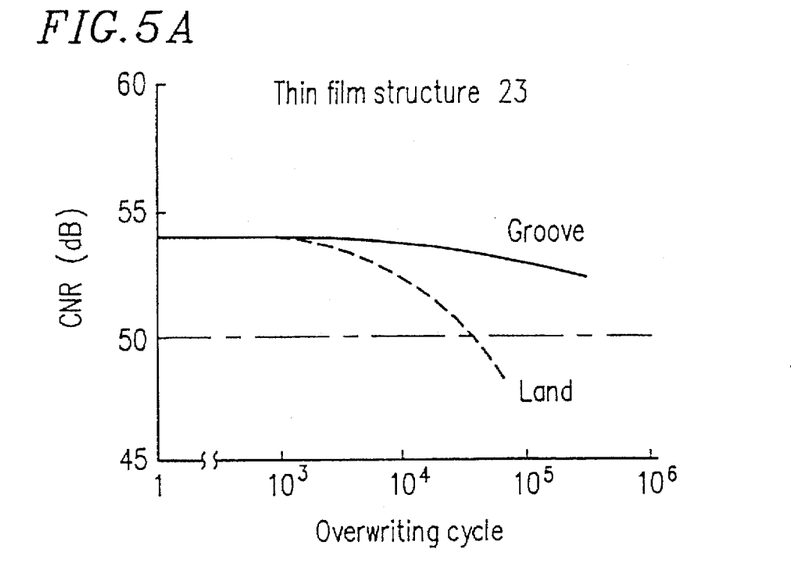
FIGS. 5A and 5B are graphs showing the change in CNR due to overwriting cycles in an example according to the present invention.
Figure 5B:
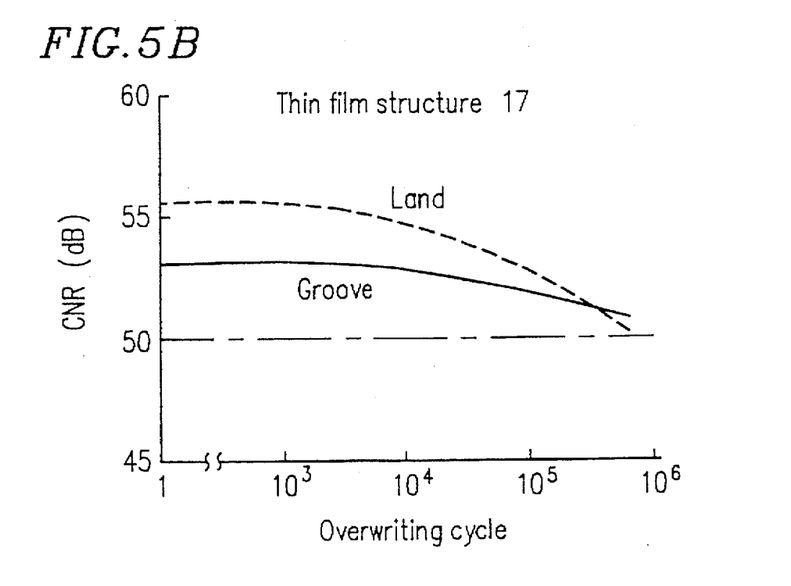

Each of the optical disks is rotated at a relative speed of 5 m/s with respect to a laser spot for reproduction. A signal of 3 MHz and a signal of 1.25 MHz are alternately overwritten onto the optical disk. CNR of a reproduced signal of 3 MHz is measured. The results of measurement plotted with respect to overwriting cycles are shown in FIGS. 5A and 5B (the upper graph shows the results for the thin film structure 23 and the lower graph shows the results for the thin film structure 17).

In the optical disk having the thin film structure 23, initial CNR is about 54 dB both for the land and for the groove. As the number of overwriting cycles increases, the CNR for the land decreases. When about 30,000 overwriting cycles have been performed, the CNR falls below 50 dB. For example, it is assumed that the number of overwriting cycles, with which the CNR falls below 50 dB, is a cycle life, the cycle life of the optical disk having the thin film structure 23 as a medium for land & groove recording is determined by the cycle performance of the land, that is, the cycle life is about 30,000 times.

In the optical disk having the thin film structure 17, however, the amplitude of a reproduced signal from the land is larger than that from the groove. As a result, initial CNR for the land is about 55.5 dB and initial CNR for the groove is about 53 dB, therefore, the CNR for the land is greater than that for the groove. If overwriting is repeated, CNR for the land is lowered as in the case of the thin film structure 23. When overwriting is repeated about 300,000 times, CNR for the land is equal to that on the groove. At that point of the cycle, both CNRs exceed 50 dB. In short, the optical disk having the thin film structure 17 has a cycle life of 300,000 times or more as a medium for land & groove recording.

From the above examination, the following is understood. The problem in the land & groove recording method that the degree, to which the quality of a signal is deteriorated with overwriting cycles on the land, is greater than that, to which the quality of a signal is deteriorated on the groove, can be reduced by designing the thin film structure so as to satisfy the following relation: $2m\pi < \Delta\phi12 < (1+2m)\pi$ (m is an integer) (the values in Table 1 correspond to m=0). As a result, the cycle life of the medium for land & groove recording can be prolonged.

EXAMPLE 5

The groove depth of the substrate, which is suitable for a land & and groove recording medium of the present invention, will be examined further in detail. Hereinafter, Example 5 regarding the groove depth will be described.

Two kinds of disk substrates (injection substrates), which are made of polycarbonate and have groove depths of 41 nm and 110 nm, respectively, are prepared. These groove depths of the disk substrates correspond to $\lambda/(12n)$ and $\lambda/(4.5n)$, respectively, in the case where a wavelength is 780 nm. The groove width and the land width are equal to each other, i.e., 0.8 μm each, as in Example 1.

The thin film structures 1 to 33, as in Example 1, are formed on these substrates so as to fabricate the optical disks. The crosstalk is measured in each case, by the same method as that in Example 1. As a result, the optical disk having a groove depth of 41 nm has a small reduction effect on the crosstalk because of the small groove depth. Hence, the crosstalk levels exceed −20 dB for all of the thin film structures.

In the case of the disk substrate having a groove depth of 110 nm, the crosstalk is small and good characteristics are obtained. However, it is found that the noise level from the land is higher than that from the groove by about 5 dB. The reason for this is considered to be as follows. Since the groove is too deep to make a resin to flow sufficiently during the injection method, the shape of the surface of the stamper is not completely transcribed.

Judging from Example 5 and Example 1 described above, the land & groove recording medium of the present invention has a groove depth D in the range of $\lambda/(8n) < D < \lambda/(4n)$, where a wavelength of a reproducing light is $\lambda$ and a refractive index of the substrate is n. If the substrate is attempted to be fabricated easily, the groove depth is preferably in the range of $\lambda/(8n) < D \leq \lambda/(5n)$. Moreover, in order to make the crosstalk sufficiently small, the groove depth is preferably in the range of $\lambda/(7n) \leq D \leq \lambda/(5n)$.

As described above, according to the present invention, the quality of the reproduced signal is excellent and is the same both for the land and for the groove. Moreover, the crosstalk between the adjacent tracks can be held at a low value even if a signal is recorded both on the land and on the groove. Furthermore, in a land & groove recording method, it is possible to increase the number of overwriting cycles. In short, it is possible to provide an optical recording medium and an optical recording apparatus suitable for a land & groove recording method. As a result, high-density optical recording can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording medium comprising: a substrate including a groove having a concave shape and a land having a convex shape adjacent to the groove; and a recording layer on the substrate,
   wherein the recording layer consists of a material which changes between a first state and a second state whose optical property is different from that of the first state,
   a first portion of the optical information recording medium consisting of said material in the first state having a first reflectance, said first portion being located on both the land and the groove, and
   a second portion of the optical information recording medium consisting of said material in the second state having a second reflectance which is different from the first reflectance, said second portion being located on both the land and the groove, said first and second portions including user recording marks, whereby information is recorded onto the groove and the land,
   and wherein a ratio of the first reflectance to the second reflectance, a phase of reflected light from said material in the first state and a phase of reflected light from said material in the second state are set such that at least one of an amplitude and a carrier to noise ratio (CNR) of a signal obtained by reproducing information from the groove is approximately identical to that from the land.

2. An optical information recording medium according to claim 1, wherein a difference D in height between the groove and the land satisfies a relation expressed by: $\lambda/(8n) < D < \lambda/(4n)$, where a width of the groove is wider than that of the land, a wavelength of reproducing light is $\lambda$ and a refractive index of the substrate is n,
   a relation expressed by: $0 \leq R2/R1 \leq 0.2$ is satisfied, where the first reflectance is R1 and the second reflectance is R2, and
   a relation expressed by: $2m\pi < \phi1 - \phi2 < (1+2m)\pi$ (m is an integer), where the phase of the reflected light from the first portion is $\phi1$, and the phase of the reflected light from the second portion is $\phi2$.

3. An optical information recording medium according to claim 1, wherein a difference D in height between the groove and the land satisfies a relation expressed by: $\lambda/(8n) < D < \lambda/(4n)$, where a width of the groove is approximately identical to that of the land, a wavelength of reproducing light is $\lambda$ and a refractive index of the substrate is n,
   a relation expressed by: $0 \leq R2/R1 \leq 0.2$ is satisfied, where the first reflectance is R1 and the second reflectance is R2, and a relation expressed by: $2m\pi < \phi_1 - \phi_2 < (1+2m)\pi$ (m is an integer), where the phase of the reflected light from the first portion is $\phi_1$, and the phase of the reflected light from the second portion is $\phi_2$.

4. An optical information recording medium according to claim 1, wherein the substrate is duplicated from a stamper previously having a convex portion and a concave portion on a surface, the substrate being fabricated so that a land face of the substrate corresponds to a transcription face of a resist face of a glass master disk for fabricating the stamper and a groove face corresponds to a transcription face of a glass face of the glass master disk, a difference D in height between the groove and the land satisfies a relation expressed by: $\lambda/(8n) < D < \lambda/(4n)$, where a wavelength of reproducing light is $\lambda$ and a reflectance of the substrate is n, a relation expressed by: $0 \leq R2/R1 \leq 0.2$ is satisfied, where the first reflectance is R1 and the second reflectance is R2, and a relation expressed by: $2m\pi < \phi_1 - \phi_2 < (1+2m)\pi$ (m is an integer), where the phase of the reflected light from the first portion is $\phi_1$, and the phase of the reflected light from the second portion is $\phi_2$.

5. An optical information recording medium according to claim 1, wherein the substrate is reproduced by an injection method from a stamper previously having a convex portion and a concave portion on a surface, a difference D in height between the groove and the land satisfies a relation expressed by: $\lambda/(8n) < D < \lambda/(4n)$, where a wavelength of reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $2m\pi < \phi_1 - \phi_2 < (1+2m)\pi$ (m is an integer), where the phase of the reflected light from the first portion is $\phi_1$, and the phase of the reflected light from the second portion is $\phi_2$.

6. An optical information recording medium according to claim 1, wherein a difference D in height between the groove and the land satisfies a relation expressed by: $\lambda/(8n) < D < \lambda/(4n)$, where a width of the land is wider than that of the groove, a wavelength of reproducing light is $\lambda$ and a refractive index of the substrate is n, a relation expressed by: $0 \leq R2/R1 \leq 0.2$ is satisfied, where the first reflectance is R1 and the second reflectance is R2, and a relation expressed by: $(2m-1)\pi < \phi_1 - \phi_2 < 2m\pi$ (m is an integer), where the phase of the reflected light from the first portion is $\phi_1$, and the phase of the reflected light from the second portion is $\phi_2$.

7. An optical information recording medium according to claim 1, wherein a difference D in height between the groove and the land satisfies a relation expressed by: $\lambda/(8n) < D < \lambda/(4n)$, where a width of the groove is approximately identical to that of the land, a wavelength of reproducing light is $\lambda$ and a refractive index of the substrate is n, and , the second reflectance R2 is approximately 0%.

8. An optical information recording medium according to claim 1, wherein a difference D in height between the groove and the land satisfies a relation expressed by: $\lambda/(8n) < D < \lambda/(4n)$, where a width of the groove is approximately identical to that of the land, a wavelength of reproducing light is $\lambda$ and a refractive index of the substrate is n, and a relation expressed by: $\phi_1 - \phi_2 = (1+2m)\pi$ (m is an integer), where the phase of the reflected light from the first portion is $\phi_1$, and the phase of the reflected light from the second portion is $\phi_2$.

9. An optical information recording medium according to claim 1, wherein a difference D in height between the groove and the land satisfies a relation expressed by: $\lambda/(8n) < D < \lambda/(4n)$, where a width of the groove is approximately identical to that of the land, a wavelength of reproducing light is $\lambda$ and a refractive index of the substrate is n, and a relation expressed by: $\phi_1 - \phi_2 = 2m\pi$ (m is an integer), where the phase of the reflected light from the first portion is $\phi_1$, and the phase of the reflected light from the second portion is $\phi_2$.

10. An optical information recording medium according to claim 1, wherein the substrate is duplicated from a stamper previously having a convex portion and a concave portion on a surface, the substrate being fabricated such that a groove face of the substrate corresponds to a transcription face of a resist face of a glass master disk for fabricating the stamper and a land face corresponds to a transcription face of a glass face of the glass master disk, a difference D in height between the groove and the land satisfies a relation expressed by: $\lambda/(8n) < D < \lambda/(4n)$, where a wavelength of reproducing light is $\lambda$ and a reflectance of the substrate is n, a relation expressed by: $0 \leq R2/R1 \leq 0.2$ is satisfied, where the first reflectance is R1 and the second reflectance is R2, and a relation expressed by: $(2m-1)\pi < \phi_1 - \phi_2 < 2m\pi$ (m is an integer), where the phase of the reflected light from the first portion is $\phi_1$, and the phase of the reflected light from the second portion is $\phi_2$.

11. An optical information recording medium according to any one of claims 2 to 10, wherein the difference D in height between the groove and the land satisfies a relation: $\lambda/(8n) < D \leq \lambda/(5n)$.

12. An optical information recording medium according to claim 11, wherein the difference D in height between the groove and the land satisfies a relation: $\lambda/(7n) \leq D \leq \lambda/(5n)$.

13. An optical information recording medium according to claim 1, wherein the material which consists of the recording layer reversibly changes between the first state and the second state due to light irradiation.

14. An optical information recording medium according to claim 13, wherein the first state and the second state belong to different phases.

15. An optical information recording medium according to claim 1, wherein a first dielectric layer, the recording layer, a second dielectric layer and a reflective layer are formed on the substrate in this order.

16. An optical information recording medium according to any one of claims 2 to 10, wherein m in the relation is 0.

* * * * *